May 17, 1966 P. T. HARPER 3,252,150
MAGNETIC FLIP-FLOP DEVICE
Filed May 15, 1961 7 Sheets-Sheet 1

INVENTOR.
PAUL T. HARPER
BY George C. Sullivan
Agent

May 17, 1966 P. T. HARPER 3,252,150

MAGNETIC FLIP-FLOP DEVICE

Filed May 15, 1961 7 Sheets-Sheet 2

INVENTOR.
PAUL T. HARPER
BY George Sullivan
Agent

*INVENTOR.*
PAUL T. HARPER
*BY* George Sullivan
Agent

May 17, 1966 P. T. HARPER 3,252,150

MAGNETIC FLIP-FLOP DEVICE

Filed May 15, 1961 7 Sheets-Sheet 4

INVENTOR.
PAUL T. HARPER
BY George C. Sullivan
Agent

MAGNETIC FLIP-FLOP DEVICE

Filed May 15, 1961 7 Sheets-Sheet 5

INVENTOR.
PAUL T. HARPER
BY George A. Sullivan
Agent

INVENTOR.
PAUL T. HARPER
BY George C. Sullivan
Agent

May 17, 1966 P. T. HARPER 3,252,150

MAGNETIC FLIP-FLOP DEVICE

Filed May 15, 1961 7 Sheets-Sheet 7

INVENTOR.
PAUL T. HARPER
BY George C. Sullivan
Agent 3,252,150
MAGNETIC FLIP-FLOP DEVICE
Paul T. Harper, Los Altos, Calif., assignor to Lockheed Aircraft Corporation, Burbank, Calif.
Filed May 15, 1961, Ser. No. 110,059
3 Claims. (Cl. 340—174)

The present invention relates to a flip-flop device and more particularly to a flip-flop device consisting of only magnetic elements and wire.

One of the primary difficulties in digital computer systems is that of reliability of the components that perform the logical functions. It is well known that the reliability of semiconductor devices, for example, diodes and transistors, is less than that of magnetic materials and wire. This being the case, considerable effort is being made to supplement semiconductor devices with magnetic elements and wire.

The present invention obviates the disadvantages of prior flip-flop devices by providing a flip-flop consisting entirely of simple magnetic elements and connecting wire. In this manner the over-all reliability of the computer logic system is greatly enhanced and the over-all complexity and cost are considerably reduced.

Accordingly, an object of the present invention is to provide a flip-flop device composed entirely of simple magnetic elements and wire.

Another object of the present invention is to provide a flip-flop device which is highly reliable.

A further object of the present invention is to provide a flip-flop device which is of low cost and simple to manufacture.

A still further object of the present invention is to provide a flip-flop device which does not employ semiconductor devices.

A still further object of the present invention is to provide a flip-flop device having maximum frequency of operation.

The specific nature of the invention, as well as other objects, uses and advantages thereof, will clearly appear from the following description and from the accompanying drawing in which.

Like numerals designate like elements throughout the figures of the drawing.

Figure 1:
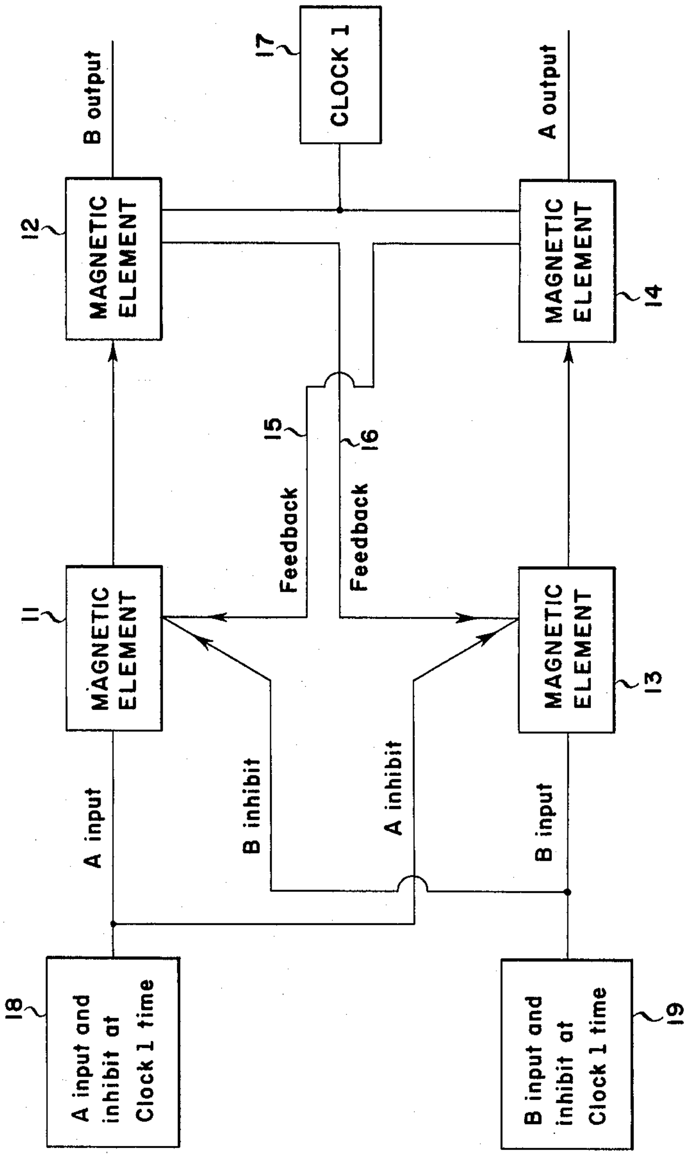
FIGURE 1 is a block diagram of one embodiment of the flip-flop device of the present invention.

In FIGURE 1 is illustrated by block diagram one embodiment of the magnetic and wire flip-flop device of the present invention. This device consists of magnetic elements 11 and 12, which together form a NOR element, and magnetic elements 13 and 14, which together form a similar NOR element. A feedback 15 is provided to operatively interconnect magnetic element 14 with magnetic element 11 and feedback 16 is provided to operatively interconnect magnetic element 12 with magnetic element 13.

Device 17 providing clock 1 pulses at consecutive intervals is operatively connected to magnetic elements 12 and 14. A pulse source denoted by reference numeral 18 is operatively connected to the A input of magnetic element 11 and to the A inhibit of magnetic element 13. Another pulse source denoted by reference numeral 19 is operatively connected to the B input of magnetic element 13 and to the B inhibit of magnetic element 11. Pulse sources 18 and 19 are provided for illustrative purposes only and in a computer logic system may consist of the output pulses of other flip-flop elements or NOR elements or any other particular element which may be used in conjunction with flip-flop circuits.

The device illustrated in FIGURE 1 operates as a set-reset type flip-flop circuit whereupon the application of a "1" to the A input of magnetic element 11 at a predetermined clock 1 time, the output of magnetic element 14 will provide a "1" output at the immediately following clock 1 time. These "1" pulses from the A output will continue at clock 1 intervals until there is an application of a "1" to the B input of magnetic element 13 at a predetermined clock 1 time. Upon the application of a "1" to the B input, the A output becomes zero at the immediately following clock 1 time and the B output of magnetic element 12 becomes "1" and will continue to provide "1" pulses at clock 1 intervals until a clock 1 pulse is again applied to the A input.

As will hereinafter become more apparent, the function of feedback 15 is to continue driving magnetic element 11 with "1" pulses at clock 1 time intervals until a "1" has been applied to the A input. Likewise, the function of feedback 16 is to continue driving magnetic element 13 with "1" pulses at clock 1 times after a "1" has been applied to the B input. Furthermore, the function of B inhibit is to cancel the effect of the "1" output of feedback 15 at the same clock 1 time as the pulse is applied to the B input so that the B output pulse will occur at the clock 1 time immediately after the B input and not at the next clock 1 time which would otherwise be the case. The function of the A inhibit is the same only it is with respect to feedback input 16 and the A output. It is to be understood that for each input winding, an inhibit winding is connected in series with the signal source or two separate output windings from a previous stage may be used to drive an input and an inhibit winding simultaneously.

Figure 2:
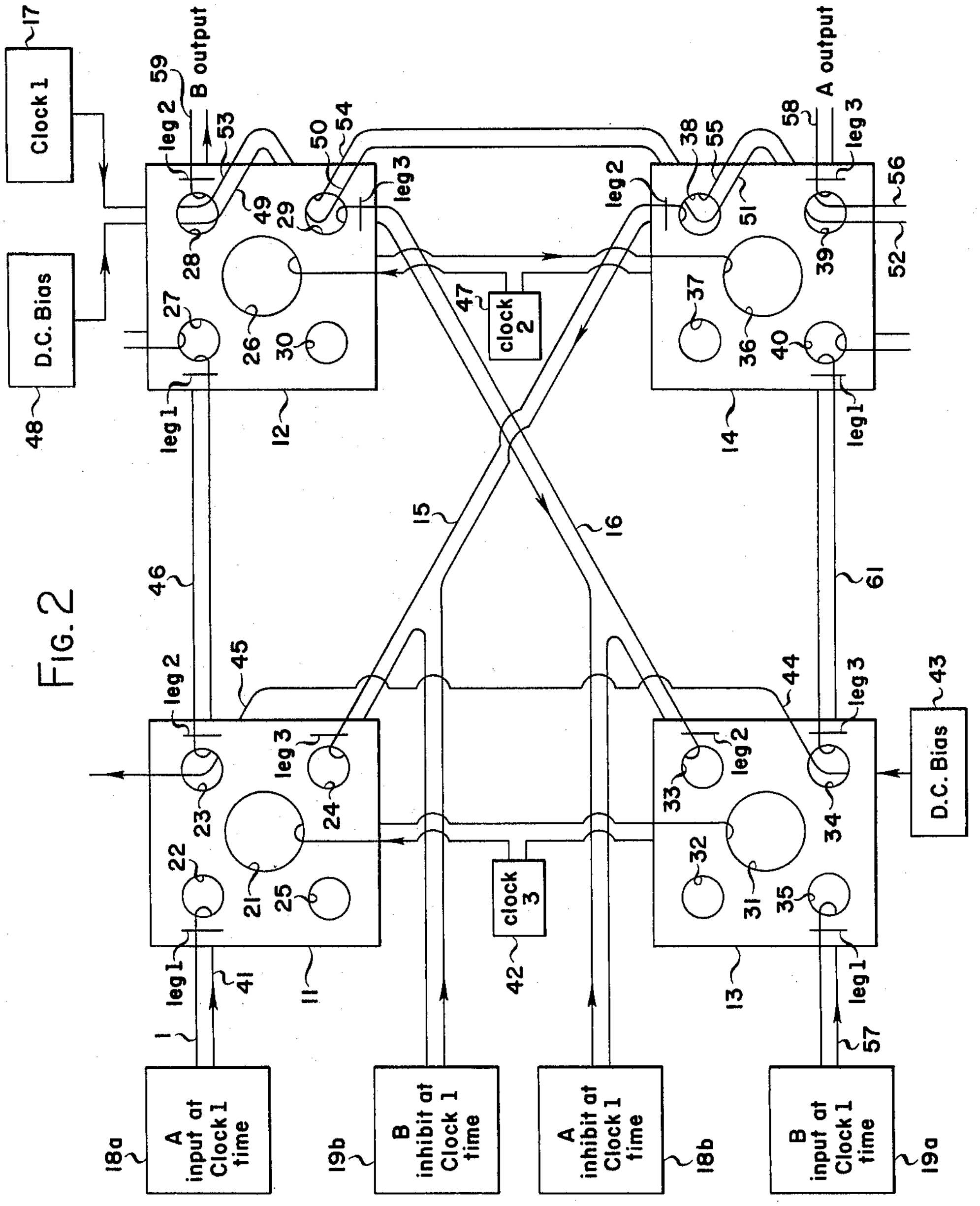
FIGURE 2 is a schematic illustration of the specific construction of the flip-flop device of the FIGURE 1 embodiment.

In FIGURE 2 is illustrated by a schematic diagram the specific construction of the flip-flop device of the FIGURE 1 embodiment. This device consists of magnetic elements 11, 12, 13 and 14 which are made of ferrite or similar material, magnetic films, which have a very rapid frequency response or tapewound cores. Magnetic element 11 includes major aperture 21 and minor apertures 22, 23, 24 and 25. Magnetic element 12 includes major aperture 26 and minor apertures 27, 28, 29 and 30. Magnetic element 13 includes major aperture 31 and minor apertures 32, 33, 34 and 35 and magnetic element 14 includes major aperture 36 and minor apertures 37, 38, 39 and 40. Through minor aperture 22 is looped input winding 41 which is operatively connected to a device denoted by reference numeral 18*a* which provides an A input at clock 1 time. A device 42 which provides pulses at clock 3 times is operatively connected to major aperture 21 of magnetic element 11 and major aperture 31 of magnetic element 13 in series. A power source device 43 providing a D.C. output has the output thereof connected in series with bias winding 44 of magnetic element 13 and bias winding 45 of magnetic element 11. Magnetic elements 11 and 12 and electrically interconnected by means of winding 46 which is looped through minor aperture 23.

of magnetic element 11 and through minor aperture 27 of magnetic element 12 and magnetic elements 13 and 14 are electrically interconnected by winding 61 through minor aperture 34 of magnetic element 13 and minor aperture 40 of magnetic element 14. A device 47 providing current pulses at clock 2 times is operatively connected in series with major aperture 26 of magnetic element 12 and major aperture 36 of magnetic element 14. A direct current source 48 is operatively connected in series with bias windings 49 and 50 which are respectively looped through minor apertures 28 and 29 and through bias windings 51 and 52 which are looped through minor apertures 38 and 39 of magnetic element 14. Device 17 providing current pulses at clock 1 times is operatively connected in series with windings 53 and 54 which respectively loop through minor apertures 28 and 29 of magnetic element 12 and through windings 55 and 56 which loop through minor apertures 38 and 39 of magnetic element 14. Feedback winding 15 loops through minor aperture 38 of magnetic element 14 and through minor aperture 24 of magnetic element 11. Connected in series with feedback 15 is a device providing the input pulse denoted by reference numeral **19*b*. Feedback winding 16 operatively interconnects minor aperture 29 of magnetic element 12 and minor aperture 33 of magnetic element 13. Connected in series with this feedback winding is the A input source denoted by reference numeral 19*b*. The purpose and function of connecting the A and B input pulses as represented by reference numerals 18*b* and 19*b* in series respectively with feedback windings 15 and 16 will hereinafter become apparent. The B input, which is generally denoted by reference numeral 19*a*, is operatively connected to minor aperture 35 by means of winding 57. The outputs of this flip-flop device are provided by means of winding 58 which is looped through minor aperture 39 of magnetic element 14 and from winding 59 which is looped through minor aperture 28 of magnetic element 12**.

In FIGURE 1 the A input and inhibit at clock 1 time was denoted by reference numeral 18; however, in FIGURE 2 the A input at clock 1 time is represented by reference numeral **18*a* and the A inhibit at clock 1 time, which occurs simultaneously with the output of 18*a*, is represented by reference numeral 18*b*. This was done in order to more clearly illustrate the function of the A inhibit pulse at clock 1 time with respect to feedback winding 16. That is, reference numerals 18*a* and 18*b* of FIGURE 2 are equivalent to the device represented by reference numeral 18 of FIGURE 1. The same is applicable with respect to the device illustrated by reference numeral 19 of FIGURE 1 and the devices represented by reference numerals 19*a* and 19*b*** of FIGURE 2.

OPERATION

Figure 3:
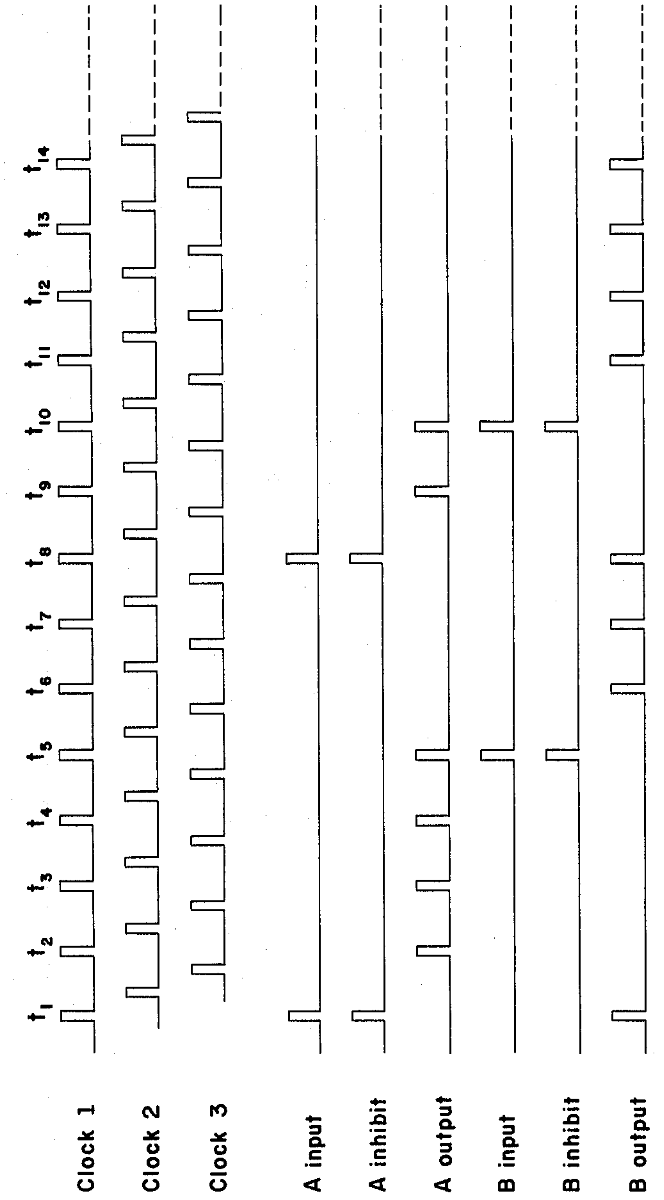
FIGURE 3 is a diagram illustrating the various clock timing pulses and the various inhibit input-output pulses which are used to illustrate the operation of the embodiments shown in FIGURES 1, 2, 5 and 6.
Figure 4:
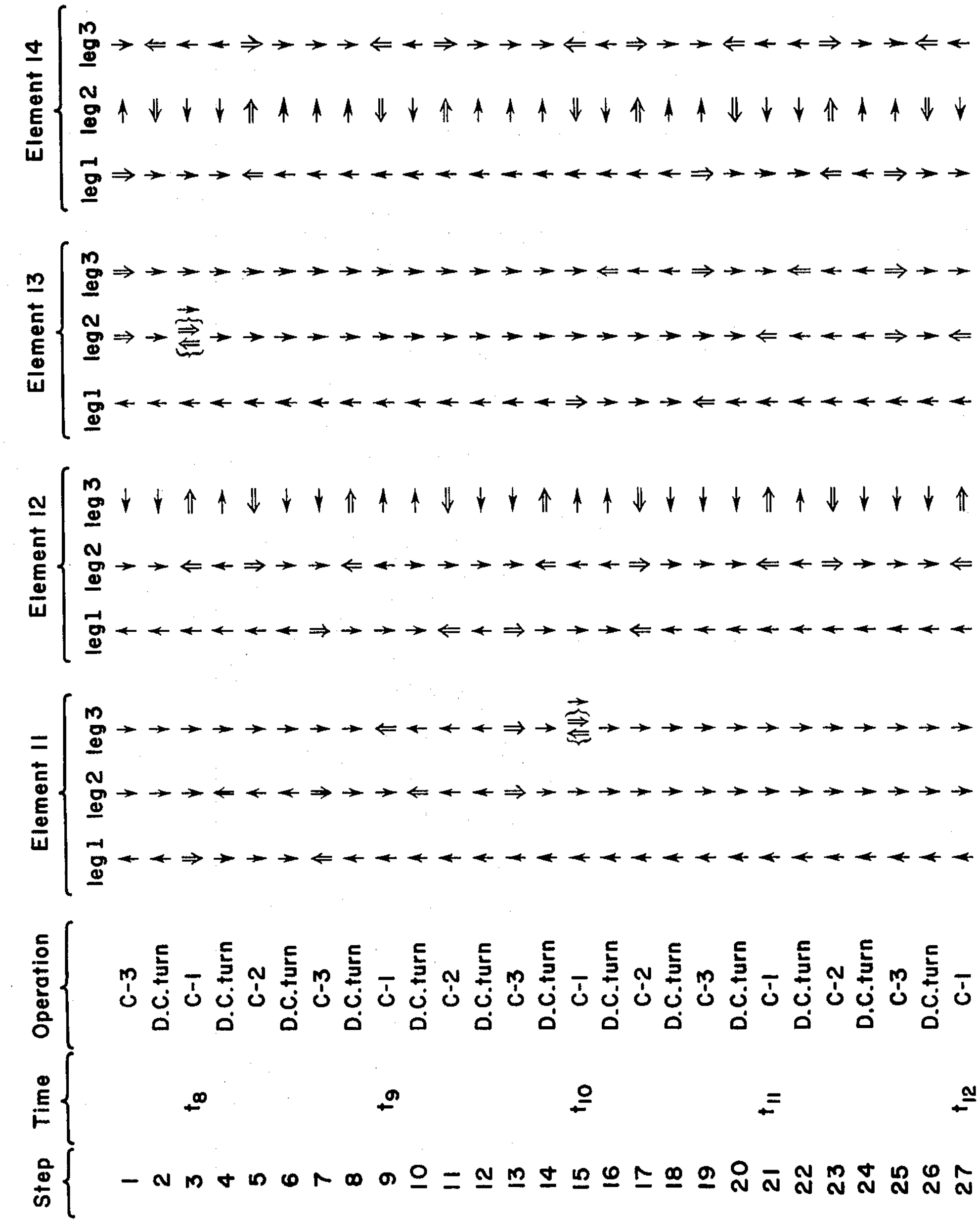
FIGURE 4 is a diagram illustrating the direction of flux in the various legs of the magnetic elements of the embodiment shown in FIGURES 1 and 2 for illustrating the sequential modes of operation thereof.

In order to illustrate the operation of the above described embodiment of the present invention reference is now directed to the diagrams illustrated in FIGURES 3 and 4 which are to be taken in conjunction with the flip-flop device specifically illustrated in FIGURE 2.

In FIGURE 3 the clock 1, clock 2 and clock 3 pulses occur respectively in sequence and at a constant frequency. For purposes of description clock 1 pulses are arbitrarily selected to separately occur at the times $t_1$ through $t_{14}$. The A input, A inhibit, A output, B input, B inhibit and B output all occur at clock 1 times. In FIGURE 3 it is assumed that a B input pulse was the immediately preceding input prior to clock 1 time $t_1$. Therefore, at clock 1 time $t_1$, there is a B output pulse. For purposes of illustration an A input pulse occurs at time $t_1$ which is followed by A output pulses at times $t_2$, $t_3$, $t_4$ and $t_5$. At time $t_5$ a B input occurs which is followed by B outputs at times $t_6$, $t_7$ and $t_8$. At time $t_8$ an A input pulse occurs which is followed by A output pulses at times $t_9$ and $t_{10}$, and at $t_{10}$ a B input pulse occurs which is followed by B output pulses at times $t_{11}$, $t_{12}$, $t_{13}$ and $t_{14}$. It should be particularly observed that at the time of application of the A or B input pulses there is the corresponding application of the A or B inhibit pulses. As will hereinafter become apparent, the function of the inhibit pulse is to provide a corresponding output pulse at the clock 1 time immediately following the clock 1 time of applying the input pulse rather than occurring at the second following clock 1 time which would otherwise occur due to the effect of the feedback pulse. That is, if it were not for the inhibit pulses there would be no output pulses at times $t_2$, $t_6$, $t_9$ and $t_{11}$.

Referring now to FIGURE 4 is a diagram illustrating the condiiton of flux legs of the various magnetic elements during typical operation of the flip-flop circuit of the present invention. The flux legs in this diagram correspond with the flux legs of the various magnetic elements as indicated by the legends on the diagram and the legends on FIGURE 2 denoting the various flux legs. The arrow heads on the flux legs indicate the direction of flux and the double legs indicate the flux has changed at the time indicated. Only three flux legs for each magnetic element are considered since an analysis of each flux turnover by the direct current bias would unduly and unnecessarily complicate the description of operation. The specific operation of the NOR devices comprising magnetic elements 11 and 12, and 13 and 14, is completely described in copending patent application Serial Number 110,058, filed on May 15, 1961 by Paul T. Harper. In this copending patent application the particular flux paths for each clock time and duration for direct current turnover are specifically set forth.

In order to explain a typical sequence of operation the hereinafter described operation takes place from the clock 3 pulse immediately preceding time $t_8$ to time $t_{12}$ wherein the A input and following feedback and the B input and following feedback are considered.

Steps 1 and 2 of FIGURE 4. From FIGURE 3 it can be seen the position of the various flux legs is that determined by the feedback pulse applied to magnetic element 12 following the application of a "1" introduced at the B input. Therefore the direction and operations on the flux in the legs of magnetic elements 11 through 14 in steps 1 and 2 is the same as that in steps 25 and 26, respectively, which will hereinafter be considered.

Step 3. At clock 1 time $t_8$ there is an A input current pulse applied to winding 41 of magnetic element 11. From the right hand rule and the direction of current flow indicated in winding 41 of FIGURE 2 there is reversal of flux leg 1 of magnetic element 11. This reversal is not sensed by other magnetic elements since an output winding is not connected with this leg. By the right hand rule it can be seen the clock 1 pulse applied to magnetic element 12 will reverse legs 2 and 3 with a resulting B output from winding 59 and a feedback pulse induced in feedback winding 16. If this induced feedback pulse were permitted to be applied to magnetic element 13 there would be a reversal of leg 2 which would result in an undesirable zero A output from magnetic element 14 at time $t_9$. In order to prevent this from occurring, the input pulse which is applied to magnetic element 11 is also applied in series opposing with the feedback pulse induced in feedback winding 16. Therefore, the flux in leg 2 of magnetic element 13 is not reversed and there will be an A output pulse at time $t_9$ from winding 58 as will hereinafter become apparent. In FIGURE 4, the effect of the feedback and inhibit pulses are shown in the brackets wherein the feedback is represented by the double arrow to the left and the inhibit is represented by the double arrow to the right with the result being indicated by the single arrow outside of the brackets. In addition, by the right hand rule it can be seen the flux induced by the clock 1 pulse in magnetic element 14 merely drives legs 2 and 3 into greater saturation with no change in the direction of flux therein.

Step 4. In step 1 of FIGURE 4 the direction of flux in legs 1 through 3 of magnetic element 11 is in the clockwise direction about major aperture 21. By application of the right hand rule it can also be seen the flux leg between minor aperture 23 and major aperture 21, not shown, is also in the clockwise direction with respect to major aperture 21. Since the flux induced by bias winding 45 is in the counter clockwise direction about minor aperture 23 the flux leg between the above mentioned minor and major apertures will offer high impedance and therefore the flux induced by the bias winding will follow a path including the flux leg between major aperture 21 and minor aperture 25, not shown, and flux leg 2. The bias current is selected to have a value sufficiently small so when the flux follows this above defined path there is no reversal of the flux legs included in this path. However, the bias current is sufficiently large so when permitted to follow the path about minor aperture 23 there is reversal of the flux legs in this path. In addition, since the bias current is small, as compared with the clock and input pulses, the output current induced in winding 46 is negligible during flux turnover of leg 2. Upon application of the A input pulse (step 3), there is reversal of the flux leg, not shown, between minor aperture 23 and major aperture 21. Therefore, immediately after cessation of the A input pulse (step 3) this reversed flux leg offers low impedance to the flux induced by the bias winding and the flux will then follow a path about minor aperture 23 which results in reversal of leg 2 as shown in step 4 of FIGURE 4. As previously indicated, the bias current is small as compared with the clock, input and output pulses, and the time for reversal of leg 2 is relatively large and the output current induced in winding 46 during flux turnover of leg 2 during step 4 is negligible. During this direct current flux turnover in leg 2 of magnetic element 11 there is no change in the flux legs of magnetic elements 12, 13 or 14.

Step 5. At clock 2 time, magnetic elements 12 and 14 are cleared by application of a current pulse from clocking device 47 to the clearing windings thereof. There is no flux reversal in legs 1 through 3 of magnetic element 14 since the direction of flux in the legs thereof is in the same direction as the flux induced by the clearing winding. However, the direction of flux in each of legs 2 and 3 of magnetic element 12 is reversed. It should be particularly noted, however, the current pulse induced into the B output winding 59 is negative going, as distinguished from the positive going current pulse induced therein in step 3. The same is likewise applicable to feedback winding 16 due to the reversal of leg 3. Since the induced current in these windings is negative going it will drive the flux legs to which they are respectively connected into further saturation and will therefore not be detrimental to the desired operation. Therefore, leg 2 of magnetic element 13 is not reversed by the reversal of flux in leg 3 of magnetic element 12 in step 5. There is no change of flux in magnetic element 11 during step 4 since there is no induced signal therein and the direct current turnover had previously occurred. There is also no detrimental effect due to the reversal of legs 1, 2 and 3 of magnetic element 14 since the signals induced by these flux reversals are all negative going and therefore drive the flux legs to which they are operatively connected into greater saturation.

Step 6. There is no direct current turnover of flux legs 2 and 3 of magnetic elements 12 and 14 since there was no input signal applied to these magnetic elements during step 5 to provide a low impedance path about minor apertures 28, 29, 38 and 39.

Step 7. At clock 3 time magnetic elements 11 and 13 are cleared by the application of a current pulse to the clearing windings thereof from clocking device 42. Since the direction of flux induced by the current in the clearing winding is clockwise, there is reversal of the direction of flux in legs 1 and 2 of magnetic element 11. The reversal of leg 2 of magnetic element 11 induces current into winding 46 which causes reversal of leg 1 of magnetic element 12. Magnetic elements 13 and 14 are not affected during the application of this clock 3 pulse.

Step 8. The direction of flux in legs 2 and 3 of magnetic element 12 is reversed by the flux induced from the direct current applied in series to windings 49 and 50. The principle of direct current flux turnover is the same with respect to these legs as it was with respect to leg 2 of magnetic element 11 hereinabove considered.

Step 9. At clock 1 time, a current pulse from clocking device 17 is applied in series with windings 53, 54, 55 and 56 of magnetic elements 12 and 14. There is no change in the direction of flux in legs 1 through 3 of mangetic element 12 since the direction of flux in these legs was already in the same direction as that induced by the current pulse in windings 53 and 54. It can therefore be seen there is no feedback current induced in winding 16 which would cause reversal of leg 2 of magnetic element 13. However, there is reversal of the flux direction in legs 2 and 3 of magnetic element 14. The reversal of leg 3 results in an A output current pulse induced in winding 58 at time $t_9$. The reversal of leg 2 results in a feedback current pulse being induced into feedback winding 15 which is coupled with aperture 24 of magnetic element 11. This feedback current pulse results in reversal of the direction of flux in leg 3 of magnetic element 11. There is no B output since the flux in leg 2 of element 12 is not reversed.

Step 10. There is a direct current flux turnover of leg 2 of magnetic element 11 during this period since the feedback input pulse causing reversal of leg 3 of magnetic element 11 during step 9 provided a low impedance flux path about minor aperture 23 upon the cessation thereof. The analysis of this operation is similar to that of steps 3 and 4 only in this instance flux leg 3 rather than flux leg 1 of magnetic element 11 is reversed. However, reversal of either of these flux legs results in reversal of the flux leg, not shown, between major aperture 21 and minor aperture 23.

Step 11. Magnetic elements 12 and 14 are cleared at clock 2 time by a current pulse applied to the clearing windings thereof. Flux legs 1 and 3 of magnetic element 12 are reversed; however, the current induced in feedback winding 16 by reversal of leg 3 is negative going and drives leg 2 of magnetic element in the same direction and into greater saturation. The reversal of leg 1 has no detrimental effect and also establishes the correct flux direction for reversal in step 13 which allows direct current flux turnover in step 14 as will hereinafter become apparent. Flux legs 2 and 3 of magnetic element 14 are reversed; however, they both provide negative current pulses and will not interfere with operation as was the case of the reversal of legs 2 and 3 of magnetic element 12 in step 5.

Step 12. There is no direct current flux turnover during this operation as in the similar case shown and described in step 6.

Step 13. The clock 3 current pulse causes reversal of legs 2 and 3 of magnetic element 11. The reversal of leg 2 induces a current pulse into winding 46 which causes reversal of the flux direction in leg 1 of magnetic element 12. The reverse feedback pulse induced into feedback winding 15 by reversal of leg 3 of magnetic element 11 drives leg 2 of magnetic element 14 into greater saturation and is therefore not detrimental to operation.

Step 14. Upon the cessation of the current pulse in winding 46 of step 13, there is a low impedance path about minor apertures 28 and 29 of magnetic element 12. Therefore the flux induced by the direct current in windings 49 and 50 causes reversal of legs 2 and 3. As previously explained, this reversal is relatively slow and the currents induced in windings 59 and 16 are negligible.

Step 15. At clock 1 time $t_{10}$ there is a B input pulse applied to winding 57 which causes flux reversal of leg 1 of magnetic element 13. At this same clock 1 time there is a current pulse applied to windings 53, 54, 55 and 56 of magnetic elements 12 and 14. As a result of this pulse there is no reversal of flux in legs 2 and 3 of magnetic element 12 since they are saturated in the same direction; however, there is flux reversal in legs 2 and 3 of magnetic element 14. The reversal of leg 3 results in an A output current pulse being induced into winding 58 and the reversal of leg 2 results in a feedback current pulse being induced into feedback winding 15. However, this feedback current pulse is negated by the simultaneous application of a current pulse in series opposing so that leg 3 of magnetic element 11 is not reversed. This is the same method of operation as was described with respect to leg 2 of magnetic element 13 in step 3 and is illustrated by the bracketed double arrows and solid arrow in step 15 of FIGURE 4.

Step 16. The flux induced by the direct current in winding 44 of magnetic element 13 causes flux turnover of leg 3 in the same manner as described with relation to leg 2 of magnetic element 11 in step 4.

Step 17. At clock 2 time legs 1 through 3 of magnetic element 12 and legs 2 and 3 of magnetic element 14 are reversed. However, the currents induced by this flux reversal are negative going and are not detrimental to the operation as previously explained.

Step 18. There is no flux leg reversal since the impedance path for the flux induced by the direct current is large about the minor apertures.

Step 19. At clock 3 time legs 1 and 3 of magnetic element 13 are reversed wherein the current induced into winding 61 causes reversal of leg 1 of magnetic element 14. There is no reversal of the legs of magnetic elements 11 and 12.

Step 20. Legs 2 and 3 of magnetic element 14 are reversed by the flux induced by the direct current in windings 51 and 52 due to the low impedance path created upon cessation of the clock 3 pulse which reversed leg 1 of magnetic element 14 in step 19. The remainder of the flux legs are not reversed.

Step 21. At clock 1 time, $t_{11}$, the flux induced by the current in windings 53 and 54 causes reversal of the flux in legs 2 and 3 of magnetic element 12. The flux reversal in leg 2 induces a B output current into winding 59 of magnetic element 12 and the flux reversal in leg 3 induces a feedback current into winding 16 which causes reversal of leg 2 of magnetic element 13. There is no reversal of the flux in leg 3 of magnetic element 14 and there is therefore no A output current induced into winding 58.

Step 22. During this step there is direct current turnover of leg 3 of magnetic element 13. This operation is analogous to that described with respect to the direct current turnover of leg 2 of magnetic element 11 in step 10.

Step 23. Magnetic elements 12 and 14 are cleared at clock 2 time by a current pulse applied to the clearing windings thereof which results in the reversal of legs 2 and 3 of magnetic element 12 and of legs 1, 2 and 3 of mangetic element 14. The effects of these reversals are not deterimental for the reasons set forth with respect to magnetic elements 12 and 14 in step 5.

Step 24. There is no direct current turnover for reasons previously explained.

Step. 25. The clock 3 current pulse causes reversal of legs 2 and 3 of magnetic element 13. This reversal of leg 3 induces a current pulse into winding 61 which causes reversal of leg 1 of magnetic element 14. The reversal of leg 2 results in a negative going signal being induced into feedback winding 16 which drives leg 3 of magnetic element 12 into greater saturation.

Step 26. Upon cessation of the current pulse induced in winding 61 in step 25, there is direct current turnover of legs 2 and 3 of magnetic element 14.

Step 27. A clock 1 time $t_{12}$ a current pulse is applied in series with windings 53, 54, 55 and 56. This current pulse causes rapid reversal of legs 2 and 3 of magnetic element 12 and no reversal to legs 2 and 3 of magnetic element 14. The reversal of leg 2 of magnetic element 12 results in a current pulse being induced in winding 59 thereby providing a B output at time $t_{12}$. The reversal of leg 3 of magnetic element 12 induces a current pulse into feedback winding 16 which causes reversal of leg 2 of magnetic element 13. Since there is no reversal of legs 2 and 3 of magnetic element 14 there is no A output induced in winding 58 and there is no signal induced in feedback winding 15.

If there were no further A or B input pulses, steps 21 through 27 would continuously repeat which would result in a series of B output pulses at clock 1 times.

Figure 5:
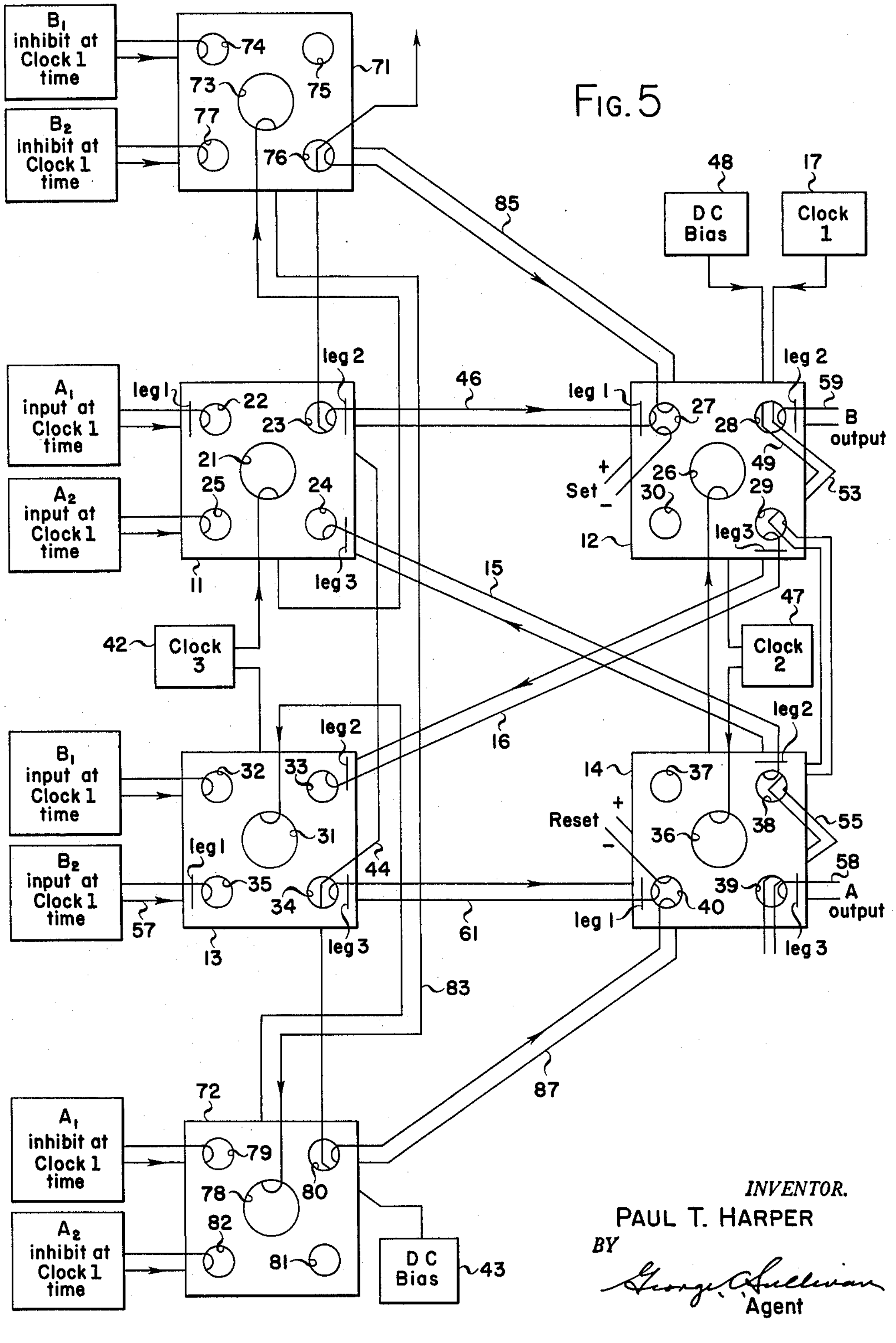
FIGURE 5 is a schematic illustration of the flip-flop circuit of another embodiment of the present invention.

In FIGURE 5 *is* illustrated another embodiment of flip-flop device of the present invention. This embodiment differs from the previously described embodiment in that inhibit pulses are applied to cancel the NOR transfer pulses at clock 3 time rather than to cancel the feedback pulses at clock 1 time.

Magnetic elements 11 through 14 and the associated wiring of the FIGURE 5 embodiment are basically the same as the corresponding magnetic elements and associated wiring of the previously described embodiment and are therefore not described in detail. As shown in FIGURE 5, in addition to magnetic elements 11 through 14 are magnetic elements 71 and 72. Magnetic element 71 includes major aperture 73 and minor apertures 74, 75, 76 and 77. Magnetic element 72 includes major aperture 78 and minor apertures 79, 80, 81 and 82. Through minor aperture 80 of magnetic element 72 and minor aperture 76 of magnetic element 71 is looped D.C. bias winding 44. Through major aperture 78 of magnetic element 72 and through major aperture 73 of magnetic element 71 is looped winding 83 from device 42 providing pulses at clock 3 times. The flip-flop device of FIGURE 5 is connected to function in response to OR inputs. That is, $A_1$ and $A_2$ inputs, and $A_1$ and $A_2$ inhibits are connected to the corresponding minor input apertures of magnetic elements 11 and 72, respectively. The $A_1$ input and the $A_1$ inhibit may provide simultaneous pulses at clock 1 time and/or the $A_2$ input and $A_2$ inhibit may provide simultaneous pulses at clock 1 time. The same is likewise applicable to the $B_1$ and $B_2$ inputs and inhibits. It is to be noted that in this embodiment the inhibit and input pulses need not occur simultaneously in that the inhibit pulse may lag the corresponding input pulse within the hereinafter defined limits.

Magnetic elements 71 and 72 are electrically interconnected by winding 85 which is looped through minor aperture 76 of magnetic element 71 and minor aperture 27 of magnetic element 12 and magnetic elements 72 and 14 are electrically interconnected by winding 87 looped through minor aperture 80 of magnetic element 72 and minor aperture 40 of magnetic element 14. As was the case with the previously described embodiment, the function of the inhibit, which is applied through windings 85 and 87 at clock 3 time, is to cancel the effect of the feedback pulses such that an output pulse occurs at the clock 1 time immediately following the clock 1 time of applying the input pulse rather than occurring at the second following clock 1 time. In this embodiment, the feedback pulse is not cancelled as it was in the previous embodiment, but is permitted to be gated from magnetic elements 11 and 13 at clock 3 time to magnetic elements 12 and 14, where it is cancelled by the pulses applied through windings 85 and 87 at clock 3 time. The main advantage of this inhibit technique is the clock and bias requirements are less stringent. This is because the phase difference between the inhibiting pulse (from either of magnetic elements 71 or 72) and the inhibited pulse (from either of magnetic elements 11 or 13) is negligible since the magnetic elements are immediately next to each other and the inhibiting and the inhibited pulse are gated out of their respective elements at the same clock 3 time. Therefore, the $A_1$, $A_2$, $B_1$ or $B_2$ inhibit pulses may come from logic that is ahead of the flip-flop by one or more layers and any phase difference between the feedback pulse and the corresponding inhibit pulse is not important or critical.

Figure 6:
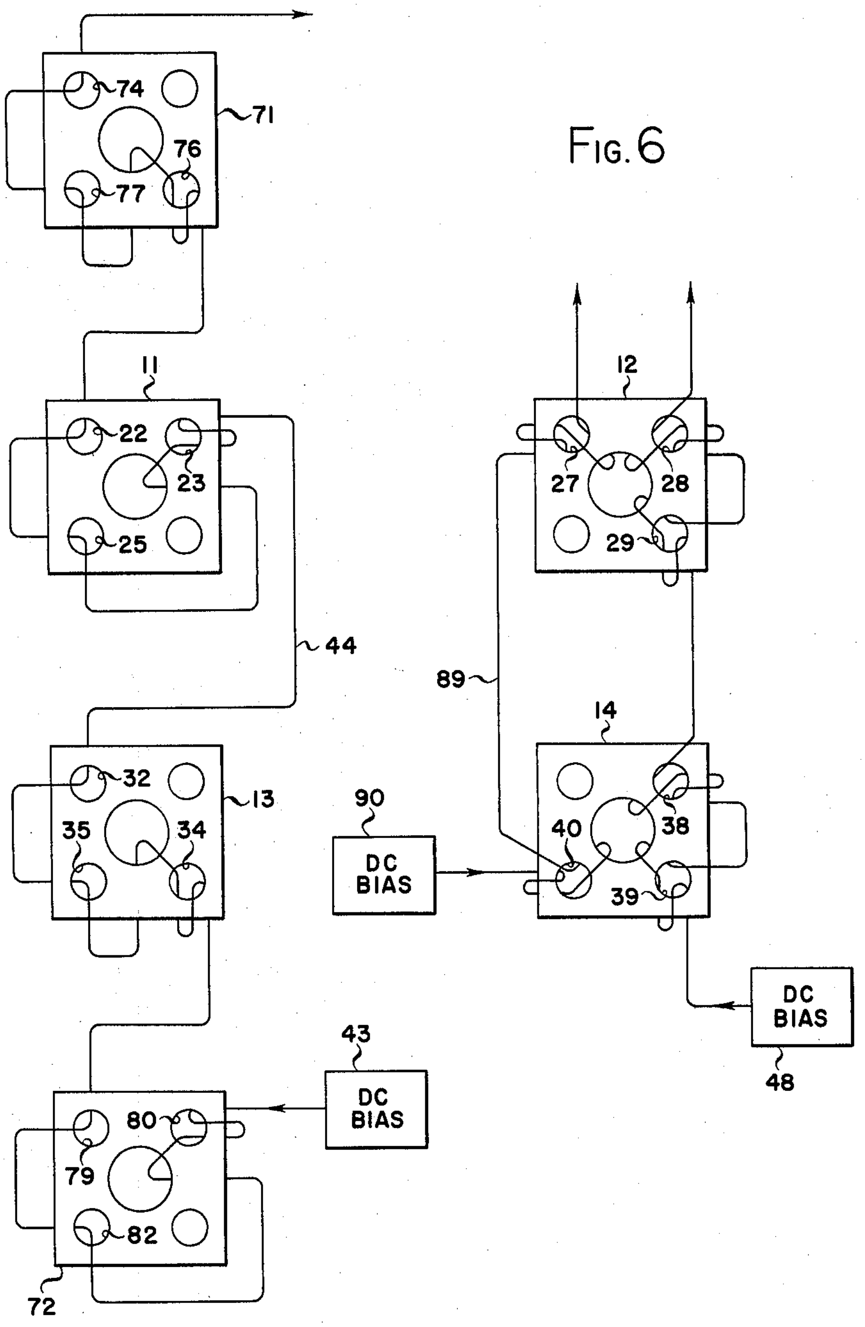
FIGURE 6 is a schematic illustration of the bias windings of the embodiment shown in FIGURE 5.

In FIGURE 6 is illustrated one method by which the bias winding are looped through the various apertures of the FIGURE 5 embodiment. It should be particularly noted that minor apertures 23, 34, 76 and 80 are provided with figure 8 type windings which widen the range of currents which may be applied hereto. In addition, minor apertures 22, 25, 32, 35, 74 77, 79 and 82 are wound to produce turnover of the flux legs, which are coupled with the input and inhibit sources, in the same direction as the direction of flux induced with the clock 3 clearing pulse. Therefore when the associated magnetic elements are cleared, current is not induced into the windings connected to the input and inhibit sources. Wire 89 is connected to D.C. bias 90 and is wound through apertures 27 and 40 as shown, to reduce the input current necessary to cause leg reversal and also to widen the range of currents which may be applied thereto. This same winding technique is used for minor apertures 28, 29, 38 and 39.

OPERATION

Figure 7:
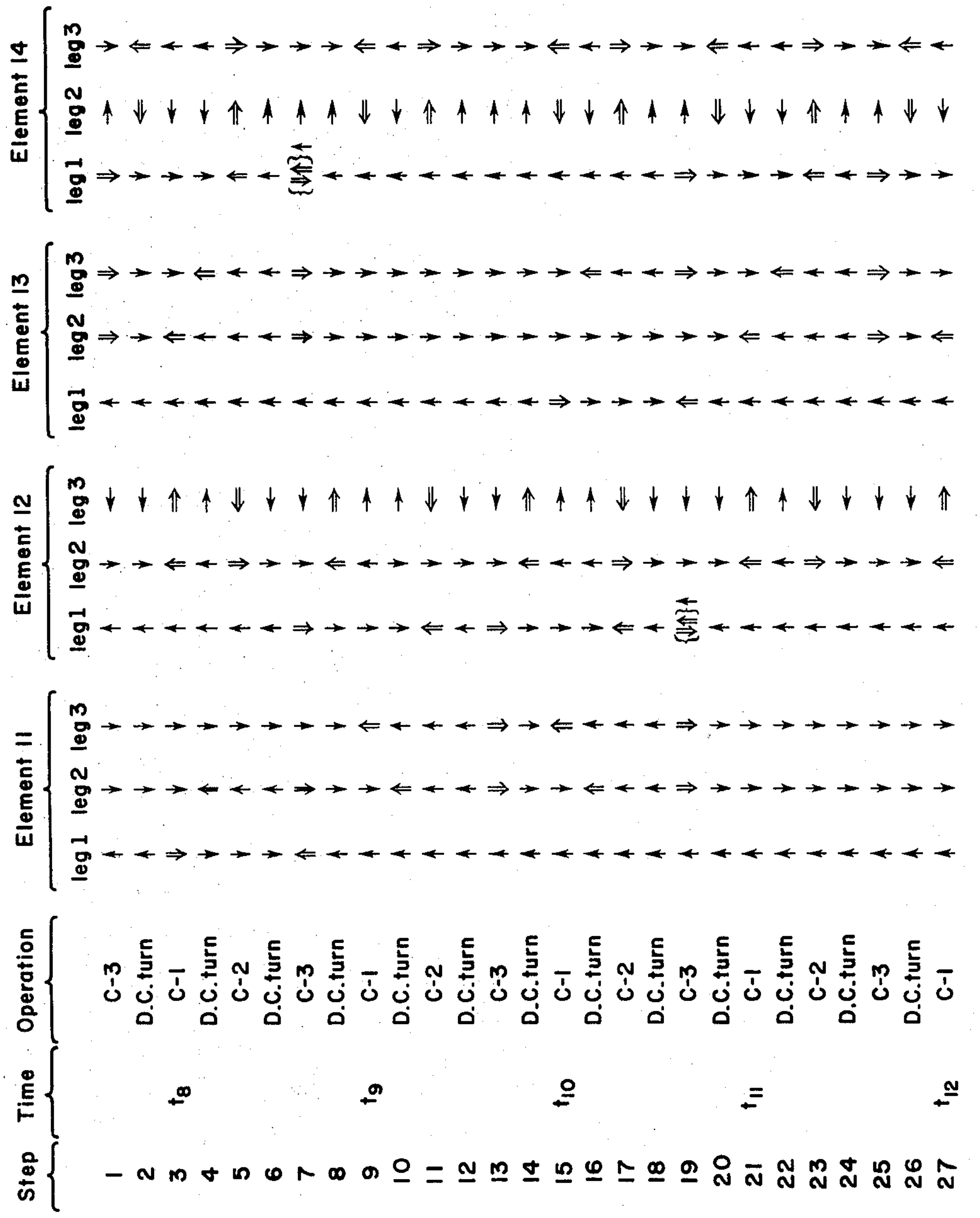
FIGURE 7 is a diagram illustrating the direction of flux in the various legs of the magnetic elements of the embodiment shown in FIGURE 5 for illustrating the sequential modes of operation thereof.

To illustrate the operation of the FIGURE 5 embodiment of the present invention, reference is directed to FIGURES 3 and 7. The sequence of clock 1, clock 2, clock 3, input, inhibit and output pulses shown in FIGURE 3 are generally applicable to the FIGURE 5 embodiment. It should be noted that since the FIGURE 5 embodiment is shown for performing the OR function, the A input denoted in FIGURE 3 represents either or both the $A_1$ and $A_2$ inputs shown in FIGURE 5. The same is likewise applicable to the A inhibit, B input and B inhibit. As shown in FIGURE 3, the A and B inhibits are in time phase with the A and B inputs, respectively. It should be particularly noted that in the FIGURE 5 embodiment, it is not necessary that the corresponding inhibit and input pulses be in time phase. That is, the A inhibit, for example, may lag the A input and occur at some time ($t_2$ for example) prior to the immediately following clock 3 pulse. This is because the feedback pulse is permitted to be gated out of the forward magnetic elements of each NOR device at clock 3 time and simultaneously with this gating, the corresponding inhibit pulse is gated out of the inhibit element to cancel the effect of the gated feedback pulse.

In FIGURE 7 is illustrated the direction of flux in the various legs of magnetic elements 11, 12, 13 and 14 at the times indicated. The flux legs of magnetic elements 71 and 72 are not illustrated since it is apparent that after these elements are cleared (clock 3 pulse), the application of an inhibit pulse to one or more of the minor input apertures thereof will result in turnover (due to D.C. bias winding looped through the minor output aperture thereof) of the leg which is coupled to the output winding (winding 85 of element 71, for example). At the next clock 3 time, the element is cleared which results in rapid reversal of this flux leg which induces a current into winding 85 in the direction shown.

The sequential operation of the flip-flop device of FIGURE 5 is as follows:

Steps 1 and 2 of FIGURE 7. This sequence of operations is the same as steps 1 and 2 of the previously described embodiment.

Step 3. The operation is the same as the previously described step 3 except the effect of the feedback pulse is not cancelled by the inhibit pulse. Therefore, the feedback pulse induced in winding 16 causes reversal of leg 2 of magnetic element 13 as illustrated by the double arrow.

Step 4. The D.C. bias causes turnover of leg 3 of magnetic element 13. The previous description of the remaining flux legs is applicable.

Steps 5 and 6. It should be noted that the direction of legs 2 and 3 of magnetic element 13 is the only difference between the FIGURE 5 embodiment and the previously described embodiment.

Step 7. At clock 3 time, magnetic elements 11 and 13 are cleared by the application of a current pulse to the clearing windings thereof from clocking device 42. Since the direction of flux in magnetic element 13 is clockwise, there is reversal of the direction of flux in legs 2 and 3 thereof. The reversal of leg 2 of magnetic element 13 is not detrimental since the current induced into winding 16, as a result of this reversal, only drives leg 3 of element 12 into greater saturation. The reversal of leg 3 of magnetic element 13 induces a current pulse, in the direction shown, in winding 61 which would normally cause reversal of leg 1 of element 14. However, a current pulse, in the direction shown, is also induced in winding 87 at clock 3 time. Since the flux induced in leg 1 of magnetic element 14 by winding 87 is in a direction opposite to the flux induced by winding 61, there is no reversal of leg 1 of magnetic element 14. Therefore, there will be an A output from winding 58 at time $t_9$. In step 7 of FIGURE 7, the effect of the transfer and inhibit pulses are shown in the brackets wherein the transfer pulse is represented by the double arrow to the left and the inhibit pulse is represented by the double arrow to the right with the result being indicated by the single arrow outside the brackets.

Steps 8 through 14. This sequence of operations is the same as previously described in steps 8 through 14.

Step 15. The feedback pulse induced in winding 15 causes reversal of leg 3 of magnetic element 11 as illustrated by the double arrow. The remainder of the operation is the same as set forth in step 15 of the previously described embodiment.

Step 16. The D.C. bias causes turnover of leg 2 of magnetic element 11. The remainder of the operation is the same as set forth in step 16 of the previously described embodiment.

Steps 17 and 18. The direction of legs 2 and 3 of magnetic element 11 is the only difference between the FIGURE 5 embodiment and the previously described embodiment.

Step 19. At clock 3 time, magnetic elements 11 and 13 are cleared and there is reversal of legs 2 and 3 of element 11. The reversal of leg 3 of magnetic element 11 has no detrimental effect since leg 2 of magnetic element 14 is only driven into greater saturation. The reversal of leg 2 of magnetic element 11 is prevented from reversing leg 1 of magnetic element 12 by the simultaneous application of a current pulse, in the direction shown, in winding 85. This is the same method of operation as was described with respect to leg 1 of element 14 (step 7) and is illustrated by the bracketed double arrows and single arrow in step 19 of FIGURE 7.

Steps 20 through 27 are identical to steps 20 through 27 of the previously described embodiment.

In view of the foregoing it can be seen that a flip-flop device is provided consisting of only magnetic elements and wire. The particular shape of the magnetic elements is not critical so long as they perform in the previously described manner. It is to be understood that the windings may be selected to have different configurations and number of turns so long as they remain compatible with the magnetic elements and currents employed. In addition, it is to be understood that inhibiting of the feedback pulse or the gated feedback pulse may be performed by either connecting the inhibit in series opposing with the feedback or gated feedback pulse as was shown and described in the FIGURE 2 embodiment or in inductive opposition as was shown and described in the FIGURE 5 embodiment. It is also to be understood that considerable fan-in and/or fan-out may be readily accomplished by adding additional windings to the magnetic elements. For example, fan-out of five may be obtained by adding another winding to each of minor apertures 29 and 39, adding another winding to each of minor apertures 28 and 38 and adding a pair of windings to each of minor apertures 30 and 37 with corresponding D.C. bias.

It is to be understood in connection with this invention that the embodiments shown are only exemplary, and that various modifications can be made in construction and arrangement within the scope of the invention as defined in the appended claims.

What is claimed is:

1. A magnetic flip-flop device comprising first, second, third and fourth multiaperture magnetic elements each of which has a plurality of minor input apertures, a plurality of minor output apertures and a major input aperture, electrical conducting material interconnecting a minor output aperture of said first element with a minor input aperture of said second element, electrical conducting material interconnecting a minor output aperture of said third element with a minor input aperture of said fourth element, electrical conducting material interconnecting a minor output aperture of said second element with a minor input aperture of said third element, electrical conducting material interconnecting a minor output aperture of said fourth element with a minor input aperture of said first element, a direct current source operatively connected to said minor output aperture of said first element and to said minor output aperture of said third element, a direct current source operatively connected to said plurality of minor output apertures of said second element and to said plurality of minor output apertures of said fourth element, a clock 1 pulse source providing pulses at constant intervals of time, a clock 2 pulse source providing pulses at constant intervals of time, a clock 3 pulse source providing pulses at constant intervals of time, the pulses from said clock 1 pulse source leading in time the pulses from said clock 2 pulse source, the pulses from said clock 2 pulse source leading in time the pulses from said clock 3 pulse source, said clock 1 pulse source operatively connected to said plurality of minor output apertures of said second element and to said plurality of minor output apertures of said fourth element, said clock 2 pulse source operatively connected to said major apertures of said second and fourth elements and said clock 3 pulse source operatively connected to said major apertures of said first and third elements.

2. The device of claim 1 including first input means for applying a current pulse to another of the minor aperture inputs of said first element simultaneously with a pulse from said clock 1 pulse source, second input means for applying a current pulse to another of the minor aperture inputs of said third element simultaneously with a pulse from said clock 1 pulse source, means applying a current pulse in series opposition with the current pulse in said fourth mentioned electrical conducting material simultaneously with the application of a current pulse by said second input means and means applying a current pulse in series opposition with the current pulse in said third mentioned electrical conducting material simultaneously with the application of a current pulse by said first input means.

3. The device of claim 1 including first input means for applying a current pulse to another of the minor aperture inputs of said first element simultaneously with a pulse from said clock 1 pulse source, second input means for applying a current pulse to another of the minor aperture inputs of said third element simultaneously with a pulse from said clock 1 pulse source, means inhibiting the flux induced by the current pulse in said first mentioned electrical conducting means at the clock 3 time immediately following the application of a current pulse by said second input means and means inhibiting the flux induced by the current pulse in said second mentioned electrical conducting means at the clock 3 time immediately following the application of a current pulse by said first input means.

References Cited by the Examiner

UNITED STATES PATENTS

| | | | |
|---|---|---|---|
| 2,802,953 | 8/1957 | Arsenault | 340—174 |
| 2,966,664 | 12/1960 | Lamy | 340—174 |
| 2,968,630 | 1/1961 | Crane | 340—174 |
| 2,995,663 | 8/1961 | Crane | 307—88 |
| 3,107,306 | 10/1963 | Dobbie | 307—88.5 |

BERNARD KONICK, *Primary Examiner.*

JOHN F. BURNS, IRVING L. SRAGOW, *Examiners.*

R. J. McCLOSKEY, M. S. GITTES, *Assistant Examiners.*